(12) United States Patent
Zhang et al.

(10) Patent No.: US 9,674,080 B2
(45) Date of Patent: Jun. 6, 2017

(54) PROXY FOR PORT TO SERVICE INSTANCE MAPPING

(71) Applicant: FUTUREWEI TECHNOLOGIES, INC., Plano, TX (US)

(72) Inventors: Hong Zhang, Palo Alto, CA (US); Louis Fourie, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 379 days.

(21) Appl. No.: 14/318,459

(22) Filed: Jun. 27, 2014

(65) Prior Publication Data

US 2015/0381478 A1 Dec. 31, 2015

(51) Int. Cl.
| | |
|---|---|
| *H04L 12/28* | (2006.01) |
| *H04L 12/725* | (2013.01) |
| *H04L 29/06* | (2006.01) |
| *H04L 12/935* | (2013.01) |
| *H04L 29/08* | (2006.01) |
| *H04L 12/741* | (2013.01) |
| *H04L 12/715* | (2013.01) |
| *H04L 12/717* | (2013.01) |

(52) U.S. Cl.
CPC ........ *H04L 45/306* (2013.01); *H04L 49/3009* (2013.01); *H04L 67/2819* (2013.01); *H04L 69/22* (2013.01); *H04L 45/42* (2013.01); *H04L 45/64* (2013.01); *H04L 45/74* (2013.01)

(58) Field of Classification Search
CPC ........ H04L 45/306; H04L 45/74; H04L 69/22
USPC ......................................... 370/389, 396, 400
See application file for complete search history.

(56) References Cited

U.S. PATENT DOCUMENTS

| | | | |
|---|---|---|---|
| 2010/0165985 A1* | 7/2010 | Sharma ............... | H04L 47/2425 370/389 |
| 2014/0307744 A1* | 10/2014 | Dunbar ................. | H04L 45/44 370/401 |
| 2014/0334488 A1* | 11/2014 | Guichard ............. | H04L 45/306 370/392 |
| 2014/0362857 A1* | 12/2014 | Guichard ............. | H04L 45/566 370/392 |
| 2015/0103827 A1* | 4/2015 | Quinn .................... | H04L 45/74 370/392 |
| 2015/0215172 A1* | 7/2015 | Kumar ................. | H04L 43/026 709/223 |
| 2015/0295831 A1* | 10/2015 | Kumar ............... | H04L 61/2514 370/235 |

* cited by examiner

*Primary Examiner* — Ricky Ngo
*Assistant Examiner* — Dewanda Samuel
(74) *Attorney, Agent, or Firm* — Slater Matsil, LLP (57) ABSTRACT

A method for managing a chain of service appliances. A method for interoperating with a legacy service appliance which does not understand/interpret the service chain header format. The method specifies a proxy device which receives a data packet with chain header that contains a chain ID. The chain ID identifies a particular service chain of network services to be performed on the data packet by a plurality of service appliances. The method removes a chain header from the data packet. The method sends the data packet to the service appliance via a logical port that corresponds to the data packet's chain ID. The method includes receiving the data packet back from the service appliance via the logical port. Lastly, the method includes restoring the chain header in the data packet based upon the logical port through which the data packet is received.

20 Claims, 4 Drawing Sheets

PROXY FOR PORT TO SERVICE INSTANCE MAPPING

TECHNICAL FIELD

The present disclosure relates generally to the field of network service management and more specifically to the field of network service chain management.

BACKGROUND

Service chaining is a way of applying a set of network services to a packet flow between a source of data packets and an endpoint (e.g., web server or data server). For example, a service chain may comprise an ordered set of network services that are interconnected through the network to support an application. A specific network service, such as a firewall appliance or network address translation (NAT) appliance may be provided by a hardware appliance or as an instance of a software application running as a virtual machine (VM) on a server. Virtualization of networking in data centers and mobile networks has led to increasing use of dynamic service chains with service instances deployed on virtual machines. A service chain may be formed by routing a packet flow between VMs from one service instance to the next in the service chain.

A service chain may be composed of an ordered sequence of service instances that reside on various service appliances. Each service appliance (which may also be referred to as a service node) applies its service functions (using one or more service instances), such as a firewall or NAT, to data packets that arrive at the service appliance. The service appliance then forwards the data packets on to a next service appliance.

Data packets may also utilize service chain headers. A service chain header may be used to transport a chain identifier (chain ID) and other metadata to network service appliances in the service chain to allow for service selection. However, there are many conventional service appliances that do not support service chain header processing. While upgraded networks often replace existing service appliances with appliances that support service chain header processing, there are still many conventional service appliances that do not support service chain headers and some hardware implemented service appliances that may never provide service chain header processing. Therefore, there is a need for handling data packets directed to service chains that include conventional service appliances that do not support service chain header processing.

SUMMARY OF THE INVENTION

Embodiments of this present disclosure provide solutions to the challenges in managing access to service chains of network services when one or more of the network services are provided by conventional service appliances that cannot process service chain IDs. In a method according to one embodiment of the present disclosure, a method for managing a chain of such service appliances is disclosed. The method includes receiving a classified data packet having a chain header and a data packet. The chain header includes a chain ID that identifies a particular service chain of network services. The data packet is mapped to a logical port associated with a service instance of a service appliance that is incapable of processing the chain header, wherein the mapping is based on the chain ID. The chain header is then removed from the classified data packet.

In one embodiment, the logical port includes an input port and an output port, wherein both the input port and the output port are associated with a service instance of a service appliance. In one exemplary implementation, mapping the data packet to the logical port associated with the service instance of the service appliance includes mapping the data packet to the output port based on the chain ID. The output port is mapped to the service instance of the service appliance. The data packet is sent to the service instance of the service appliance via the output port. The input port can also be mapped to the service instance of the service appliance. The chain header is restored to a data packet received from the service instance of the service appliance via the input port.

In an apparatus according to one embodiment, a proxy device is disclosed. The proxy device comprises a service chain header (SCH) stripper and a chain to port mapping mechanism coupled to the SCH stripper. The chain to port mapping mechanism is configured to receive a classified data packet having a chain header and a data packet, and map the data packet to a logical port associated with a service instance of a service appliance that is incapable of processing the chain header. The mapping is based on a chain ID contained in the chain header. In one embodiment, the chain to port mapping mechanism is a chain identifier to port mapping mechanism. The SCH stripper removes the chain header from the classified data packet. The chain to port mapping mechanism is further configured to send the data packet to the service instance of the service appliance via the logical port associated with the chain ID. The chain to port mapping mechanism is also configured to receive the data packet from the service instance of the service appliance via the logical port associated with the chain ID. The proxy device can be further configured to send the restored data packet to a next service appliance.

In a system according to one embodiment, a service system is disclosed. The service system includes a proxy device and a service appliance. The proxy device is configured to receive a classified data packet having a chain header and a data packet. The proxy device is further configured to obtain a chain ID from the chain header, map the data packet to one of the plurality of logical ports, based on the chain ID, and remove the chain header from the classified data packet. The service appliance has a port to service instance mapping mechanism coupled to the proxy device via a plurality of logical ports, wherein the service appliance is incapable of processing the chain header. The port to service instance mapping mechanism is configured to map the one of the plurality of logical ports to a service instance of the service appliance.

In accordance with at least one embodiment, the proxy device is further configured to send the data packet to the port to service instance mapping mechanism via a logical ports associated with the chain ID. The proxy device can also be further configured to receive the data packet from the port to service instance mapping mechanism via the logical port associated with the chain ID, and restore the chain header to the received data packet. A logical port can includes an input port and an output port, wherein both the input port and the output port are mapped to the service instance of the service appliance by the port to service instance mapping mechanism.

It is appreciated the embodiments of this present disclosure can be implemented in a variety of configurations The proxy device can be one of a network device, a virtual machine running on a server, a part of one of a switch, or a part of a service appliance. The service appliance can comprise at least one of a virtual machine and a physical, hardware implemented appliance.

BRIEF DESCRIPTION OF THE DRAWINGS

Embodiments of the present disclosure will be better understood from the following detailed description, taken in conjunction with the accompanying drawing figures in which like reference characters designate like elements and in which.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and mechanisms have not been described in detail so as not to unnecessarily obscure aspects of the present disclosure.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Embodiments of this present disclosure provide solutions to the increasing challenges in managing access to service chains of network services when one or more of the network services of the chain of network services are provided by conventional service appliances that cannot process service chain headers. Various embodiments of the present disclosure provide exemplary methods for processing service chain headers for conventional service appliances that are unable to process them. As discussed in detail below, various embodiments of the present disclosure provide exemplary proxy devices to remove the header information and to map data packets of particular service chains to corresponding logical ports to allow identification of a data packet's service chain even without the service chain ID. As also discussed herein, data packet having chain ID to port mapping and port to service instance mapping are used to map a data packet to a particular service instance of a service appliance, based on the chain ID.

As discussed herein, there are many conventional service appliances (which may also be referred to as "legacy service appliances") that do not support service chain header processing. Hereinafter, these conventional service appliances are referred to as non service chain header (SCH)-aware service appliances. As discussed herein, a service chain proxy device may be associated with one or more non SCH-aware service appliances and is used to process service chain headers associated with the data packets. Conventional proxy devices have no mechanism to select a particular service instance on a non SCH-aware service appliance. Therefore, conventional proxy devices may map a data packet having a chain ID to a service appliance but are unable to map the chain ID to a particular service instance of the service appliance.

Figure 1:
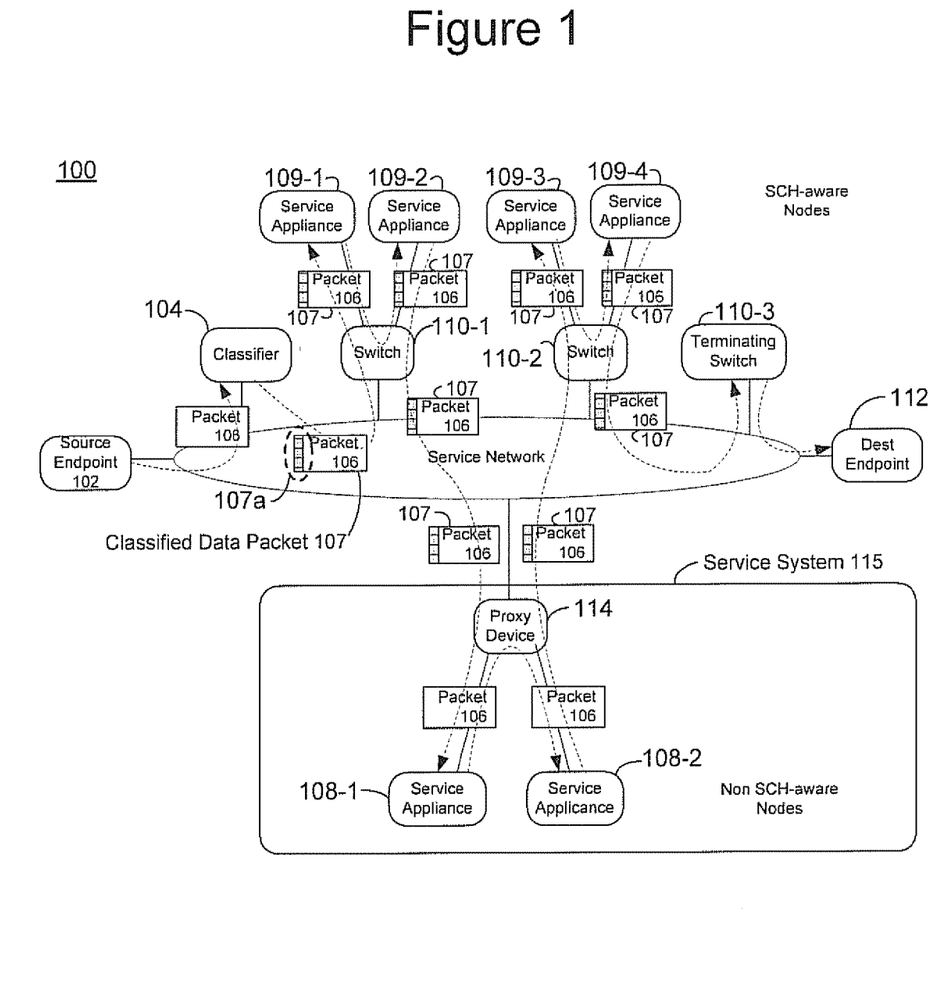
FIG. 1 illustrates a block diagram of an exemplary service chain in accordance with an embodiment of the present disclosure.

In one embodiment, illustrated in FIG. 1, an exemplary service network 100 comprises a source endpoint 102 (also known as a "client node") delivering a plurality of data packets 106 (which may also be referred to as "packets" herein) to the service network 100 for desired network services (e.g., firewall, intrusion detection/prevention, etc.). As illustrated in FIG. 1, the packets or data packets 106 are received by a classifier 104 for classification. A data packet 106 may be classified according to which service chain it belongs to. In one embodiment, an exemplary service chain describes an ordered series of service appliances, where each service appliance of the series of service appliances supplies a particular network service to the data packet 106. An exemplary service chain header 107A carries a unique chain ID to identify a particular service chain. As further illustrated in FIG. 1, the classifier 104 receives a data packet 106 and outputs a classified data packet 107 which includes an exemplary service chain header 107A. The service chain header 107A contains a particular service chain ID, identifying the classified data packet's 107 desired service chain.

As illustrated in FIG. 1, a classified data packet 107 may be directed to a variety of service appliances, each able to provide a particular network service. As also illustrated in FIG. 1, the service appliances may also be divided into SCH-aware service appliances 109 (that are able to process service chain headers) and non SCH-aware service appliances 108 (that are unable to process service chain headers). As described in detail herein, the service chain headers 107A may be removed from the classified data packets 107 before they are passed to the non SCH aware service appliances 108 to receive their network services.

As further illustrated in FIG. 1, an exemplary classified data packet 107 may follow a particular order (as assigned by an associated service chain) through the service network 100. For example, a classified data packet 107, after leaving the classifier 104, is directed to a first switch 110-1 through which the classified data packet 107 is guided to a first service appliance 109-1 and then a second service appliance 109-2, after returning from the first service appliance. After which, the first switch 110-1 may direct the classified data packet 107 to a proxy device 114 where the service chain header 107A is removed, such that a data packet 106 (the classified data packet 107 with the service chain header 107A removed) is passed to a first non SCH-aware service appliance 108-1 and then to a second non SCH-aware service appliance 108-2, after returning from the first non SCH aware service appliance 108-1. In one embodiment, proxy device 114, non SCH aware service appliance 108-1, and non SCH aware service appliance 108-2 are included in service system 115.

As also illustrated in FIG. 1, the proxy device 114, after restoring the service chain header 107A to the data packet 106 (as described in detail herein), directs the restored classified data packet 107 to a second switch 110-2, through which the classified data packet 107 is guided to a third service appliance 109-3 and then a fourth service appliance 109-4, after returning from the third service appliance 109-3. After which, as illustrated in FIG. 1, the second switch 110-2 may direct the classified data packet 107 to an exemplary terminating switch 110-3, where the classified data packet 107 may be received by an exemplary destination endpoint 112. In one embodiment, an exemplary destination endpoint 112 may be a web server or a database server.

In one embodiment, the source endpoint 102 may define how the classifier 104 classifies data packets 106 that are received by the classifier 104. In one embodiment, an exemplary classifier 104 classifies received data packets 106 according to a variety of policy criteria. The classifier 104 adds a service chain header 107A to the data packet 106 (converting it into a classified data packet 107) to identify that the data packet 107 is to be processed by a desired series of service instances in the service chain. In one embodiment, an exemplary classifier 104 may be implemented as a network node, such as a network switch or gateway, or as a VM running on a server.

As noted above, FIG. 1 illustrates exemplary service appliances that are either SCH-aware service appliances 109 that are able to process the service chain headers 107A of the classified data packets 107, or are non SCH-aware service appliances 108 that are unable to process the service chain headers 107A of the classified data packets 107. While FIG. 1 illustrates an exemplary two non SCH-aware service appliances (108-1 and 108-2) and an exemplary four SCH-aware service appliances (109-1, 109-2, 109-3, & 109-4), any number of non SCH-aware service appliances 108 and/or SCH-aware service appliances 109 may be implemented in the service network 100 as a service chain.

As also discussed herein, a service appliance or service node (108 or 109) may be either a virtual machine (VM) or a physical, hardware appliance. For example, a firewall appliance may run on a virtual machine or as a hardware appliance. Therefore, there can be a chain of service appliances (108 or 109) implemented as either virtual machines or physical hardware appliances, or a combination of both. In one embodiment, an exemplary service appliance (108 or 109) may implement a plurality of service instances, where different service chains access different service instances.

In one embodiment, an exemplary service chain may comprise both SDN enabled service appliances and non-SDN service appliances. In one embodiment, SDN enabled service appliances may include intrusion prevention systems (IPS), firewalls (FW), intrusion detection systems (IDS), and network address translation (NAT) appliances, while non-SDN enabled service appliances may include caches, quality of service (QoS) appliances, virtual private networks (VPN), load balancers, and WAN optimization controllers (WOC). As discussed herein, an exemplary service chain ID may indicate a particular series of ordered service nodes or service appliances.

As discussed herein, an exemplary service appliance, whether an SCH-aware service appliance 109 or a non SCH-aware service appliance 108, may comprise a plurality of service instances that are implemented by the service appliance (108 or 109). An exemplary service chain header's 107A unique chain ID, in addition to identifying a particular service chain, will also identify which service instance on the service appliance is to be selected. However, as discussed herein, there are many non SCH-aware service appliances 108 that are unable to process service chain headers 107A. Therefore, as discussed herein, exemplary embodiments provide a mechanism to allow an associated service chain proxy device 114 to relay service instance selection information to one or more interconnected non SCH-aware service appliance 108. As illustrated in FIG. 1, and discussed in detail below, an exemplary proxy device 114 removes a service chain header 107A of the classified data packet 107 (to convert the classified data packet 107 into the original data packet 106 that does not contain the service chain header 107A) and sends the data packet 106 to the non SCH-aware service appliance 108. As discussed herein, an exemplary proxy device 114 may be implemented as an independent network device (e.g., a network router, network switch, or gateway) or server, a VM running on a network server, or as part of a network device or service appliance. In other words, there are no restrictions on where or how the proxy device 114 may be implemented.

Figure 2A:
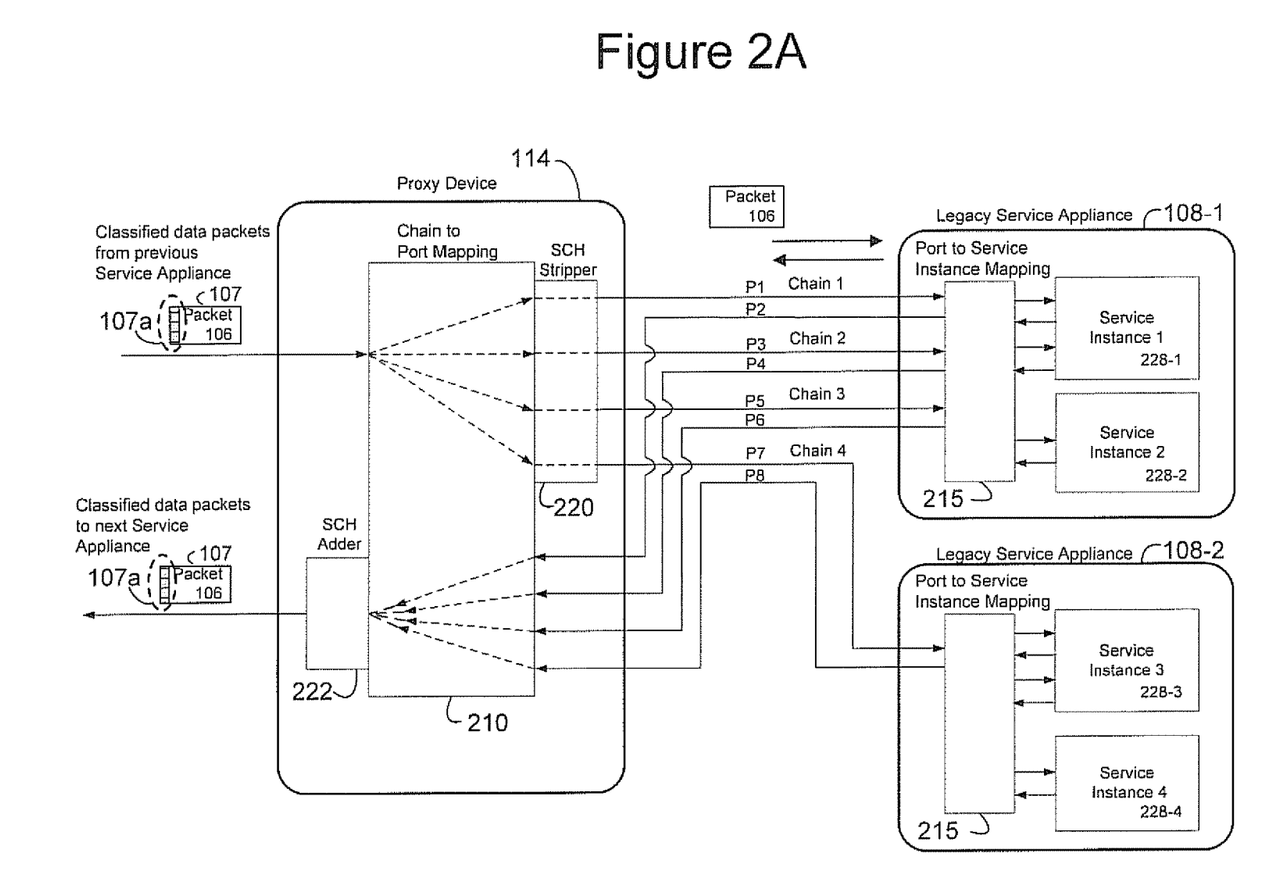
FIG. 2A illustrates a block diagram of an exemplary paired proxy device and service appliances that are unable to process service chain headers in accordance with an embodiment of the present disclosure.

FIG. 2A illustrates in more detail the exemplary pair of non SCH-aware service appliances 108-1, 108-2 serviced by an exemplary proxy device 114, as illustrated in FIG. 1. As illustrated in FIG. 2A, the exemplary proxy device 114 comprises a chain to port mapping mechanism 210, a SCH stripper 220 and a SCH adder 222. In this embodiment, the proxy device 114 is coupled to the legacy service appliances 108-1 and 108-2 via a plurality of logical port pairs, where each logical port pair is associated with a chain ID. For example, one of the logical port pairs includes an output port P1 and an input port P2, which are associated with chain 1.

In one embodiment, each logical port pair is mapped to a particular service instance of a service appliance, via port to service instance mapping mechanism 215. For example, the logical port pair (P1 and P2) are mapped to service instance 1 of legacy service appliance 108-1.

In one embodiment, after a classified data packet 107, which includes a chain header 107A and a data packet 106, is received by the proxy device 114, the chain to port mapping mechanism 210 obtains a chain ID contained in the chain header 107A and maps the data packet 106 to a particular output port of a logical port pair, based on the obtained chain ID. Then, the SCH stripper 220 removes the chain header 107A from the classified data packet 107 and sends the data packet 106 on the mapped output port associated with the desired service instance in a legacy service appliance. As illustrated in FIG. 2A, the chain to port mapping mechanism 210 maps exemplary chain 1 data packet 106 to output port P1, exemplary chain 2 data packet 106 to output port P3, exemplary chain 3 data packet 106 to output port P5, and exemplary chain 4 data packet 106 to output port P7. In one embodiment, the SCH stripper 220 may be used to remove the chain header 107A from the classified data packet 107 after the mapping operation performed by the chain to port mapping mechanism 210.

As also illustrated in FIG. 2A, the data packets 106 are received by the desired service appliances 108-1, 108-2 and directed to a desired service instance 228 via an exemplary port to service instance mapping mechanism 215 of the non SCH-aware service appliances 108-1 and 108-2. In one embodiment the port to service instance mapping mechanism 215 may be implemented via software applications. In another embodiment, the port to service instance mapping mechanism 215 may be implemented as a virtual machine or as a physical, hardware appliance. Furthermore, the port to service instance mapping mechanism 215 may be implemented as part of a service appliance 108 or external to a service appliance 108.

Figure 2B:
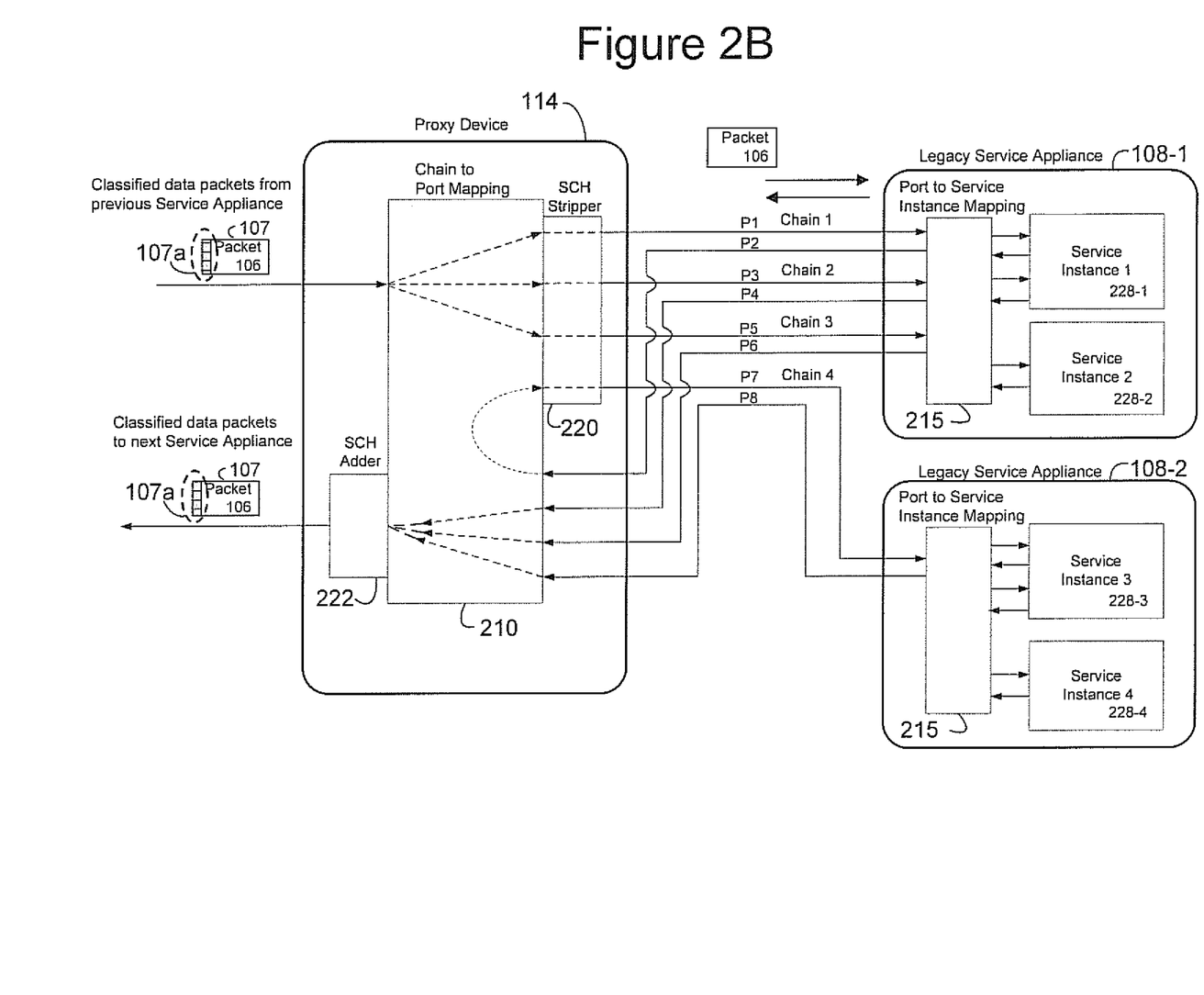
FIG. 2B illustrates a block diagram of an exemplary proxy device that sends data packets through a pair of service appliances as defined by a service chain.

As illustrated in FIG. 2A, each of the service instances (228-1, 228-2, 228-3, & 228-4) are mapped to a corresponding output port and input port on the proxy device 114, via port to service instance mapping mechanism 215. For example, service instance 1 (228-1) is mapped to output port P1 and input port P2 via the port to service instance mapping mechanism 215, such that the chain to port mapping mechanism 210 can send the data packet 106 on output port P1 and receive the data packet 106 back on input port P2. As illustrated in FIG. 2A, each input port is mapped based on a chain ID identifying a particular service chain (just as each corresponding output port is also mapped to the same service chain), such that the SCH adder 222 may restore the service chain header 107A (containing the chain ID) to the data packet 106 received via an input port. The data packet 106 is therefore restored to a classified data packet 107 with a proper service chain header 107A, ready to be sent out by the proxy device 114 to a next service appliance 108 or 109. As illustrated in FIGS. 1, 2A, and 2B, a proxy device 114 may be communicatively coupled to one or more non SCH-aware service appliances 108, such that after a first non SCH-aware service appliance 108-1 has performed its prescribed network service, the proxy device may send the data packet 106 on to the second non SCH-aware service appliance 108-2 to receive its prescribed network service. After which, the proxy device 114 restores the data packet's 106 service chain header 107A and sends the restored classified data packet 107 out to the next service appliance 108, 109.

In one exemplary implementation, a data packet 106 is mapped to output port P1 by proxy mechanism 114 based upon the data packet 106 being associated with chain 1, as indicated by a chain ID of a service chain header 107A received with the data packet 106. Output port P1 is mapped to service instance 1 (228-1) via the port to service instance mapping mechanism 215 of the non SCH-aware service appliance 108-1. Service instance 1 (228-1) is also mapped to input port P2 via the port to service instance mapping mechanism 215. After the service instance has completed the prescribed network service, the data packet 106 is sent back to the proxy device 114 via input port P2. Proxy device 114 restores or re-associates the service chain header 107A (containing the chain ID associated with chain 1) with the data packet 106 to form a classified data packet 107.

In one embodiment, in addition to the chain header fields, an exemplary data packet header may also include metadata and other fields of data. Most service chain headers 107A, as discussed herein, may also include a service chain ID. As discussed herein, when the service chain header 107A is removed by the SCH stripper 220, the service chain ID and associated fields are gone and the above described chain to port and port to service instance mapping is necessary to ensure a service chain's data packets are received by the desired service instance.

In one embodiment, a reclassification of the raw data packet 106 may be attempted (based upon one or more data fields in the data packet 106). However, the service appliance 108 may have changed one or more of these fields. In other words, the original classifier 104 classifies the data packets 106 into particular flows and these flows are classified based upon the data found in the header fields of the data packet 106. In one embodiment, in addition to the chain header, a packet header may include a source ID, a destination ID, a port number, and an application type, etc. Based on this information, the classifier 104 may classify the data packets 106 into particular service chains. However, as discussed herein, once a data packet 106 comes back from a service appliance 108, those header fields may have been changed, which may result in an incorrect reclassification of the data packet 106.

As illustrated in FIG. 2A, a pair of logical ports (input and output ports) may be associated with each service instance of a service appliance 108. In one embodiment there are dedicated pairs of logical ports (P1/P2, P3/P4, P5/P6, and P7/P8) for each service chain/instance. For example, as illustrated in FIG. 2A, a first service chain goes into a logical port pair P1 and P2, a second service chain goes into a logical port pair P3 and P4, a third service chain goes into a logical port pair P5 and P6, and a fourth service chain goes into a logical port pair P7 and P8. In one embodiment, a logical port may refer to a separate ingress port and a separate egress port (e.g., P1 and P2), while in another embodiment, a logical port may refer to a single port that is used for both ingress and egress.

Therefore, as illustrated in FIG. 2A, a service chain header 107A may be stripped off a classified data packet 107 by an SCH stripper 220 of the proxy device 114, resulting in a data packet 106 that is then sent to the appropriate non SCH-aware service appliance 108 (and its corresponding service instance 228) on the logical port (P) dedicated for its particular service chain. As illustrated in FIGS. 2A and 2B, a proxy device 114 may be coupled to one or more non SCH-aware service appliances 108, such as a first non SCH-aware service appliance 108-1 with a first and second service instances (228-1 & 228-2) as well as a second non SCH-aware service appliance 108-2 with a third and fourth service instances (228-3 & 228-4).

As discussed herein, the non SCH-aware service appliance 108 will return the data packet 106 (after performing the network service) back to the proxy device 114 through the designated input port of the logical port pair. Therefore, when the proxy device 114 receives a data packet 106 from a particular service instance 228 of a non SCH-aware service appliance 108, the proxy device 114 knows which chain the data packet 106 belongs to, based upon the input port that was used to return the data packet 106 to the proxy device 114.

Therefore, as illustrated in FIG. 2A, an exemplary set of logical ports between a proxy device 114 and one or more non SCH-aware service appliances 108 may be used to discriminate service chains and to thereby select particular service instances (228-1 and 228-2; and 228-3 and 228-4) on the legacy service appliances 108-1 and 108-2, respectively. As illustrated in FIG. 2A, each service chain may be associated with a pair of logical ports between the proxy device 114 and a non SCH-aware service appliance 108. One logical port of the pair of logical ports (called the output port) may be used to send data packets 106 from the proxy device 114 to a desired service instance 228 of a service appliance 108, while the other logical port of the pair of logical ports (called the input port) may be used to send data packets 106 from the non SCH-aware service appliance 108 and back to the proxy device 114. This exemplary logical port mapping allows a service appliance 108 to associate a particular service instance 228 with a specific service chain (e.g., service chain 1, service chain 2, service chain 3, and service chain 4). This logical port mapping also allows the SCH adder 222 of the proxy device 114 to associate data packets 106 returned from the service appliances 108 to specific chains so that chain-specific headers may be added to the received data packets 106 to restore them to classified data packets 107 with their corresponding service chain headers 107A.

Because the data packets 106 are channeled to the appropriate service instances and back again to have their corresponding service chain headers 107A restored, it does not matter whether any packet fields were changed by a service instance 228 of a service appliance 108. The exemplary proxy device 114 does not look at the fields. The selection of a chain ID for the received data packet 106 is based on which logical port (e.g., P2, P4, P6, or P8) the data packet 106 was received on. In one embodiment, an exemplary proxy device 114 will add back the service chain header 107A (and associated chain ID) and forward the restored classified data packet 107 on to a next switch 110 to repeat the process until an endpoint node 112 is reached.

FIG. 2B illustrates an exemplary service chain mapping between service instance 228-1 of service appliance 108-1 and service instance 228-3 of service appliance 108-2. As illustrated in FIG. 2B, a data packet 106 designated as chain 1 may be sent by a proxy device 114 to service instance 228-1 of service appliance 108-1 on output port P1. After service instance 228-1 completes its designated network service, the data packet 106 may be sent back to the proxy device 114 on input port P2. However, rather than sending the chain 1 data packet 106 to a SCH adder 222, as illustrated in FIG. 2A, for service chain header 107A restoration, the chain 1 data packet 106 is sent out on output port P7 to service instance 228-3 of service appliance 108-2. After the network service is completed, the service instance 228-3 may send the data packet back to the proxy device 114 on input port P8 for service chain header restoration at the SCH adder 222.

As discussed herein, there may be a combination of non SCH-aware service appliances 108 (that are not able to process chain headers) and SCH-aware service appliances 109 (that are able to process chain headers). As illustrated in FIGS. 1 and 2A, each non SCH-aware service appliance 108 may be paired with a proxy device 114.

Therefore, exemplary embodiments allow the use of service chain headers 107A to classify service chains for use with non SCH-aware service appliances 108 that are not able to process service chain headers 107A (and therefore unable to determine what service chain the classified data packets 107 are associated with), by teaming each non SCH-aware service appliance 108 with an exemplary proxy device 114. As discussed herein, the proxy device 114 removes and replaces a service chain header 107A through the use of an SCH stripper 220 and an SCH adder 222, respectively, as well as a chain to port mapping mechanism 210 and a port to service instance mapping mechanism 215. Furthermore, when a non SCH-aware service appliance 108 is replaced with an SCH-aware service appliance 108 that can process service chain headers, only the proxy device 114 needs to be removed, allowing for an easy and straightforward upgrade process.

Figure 3:
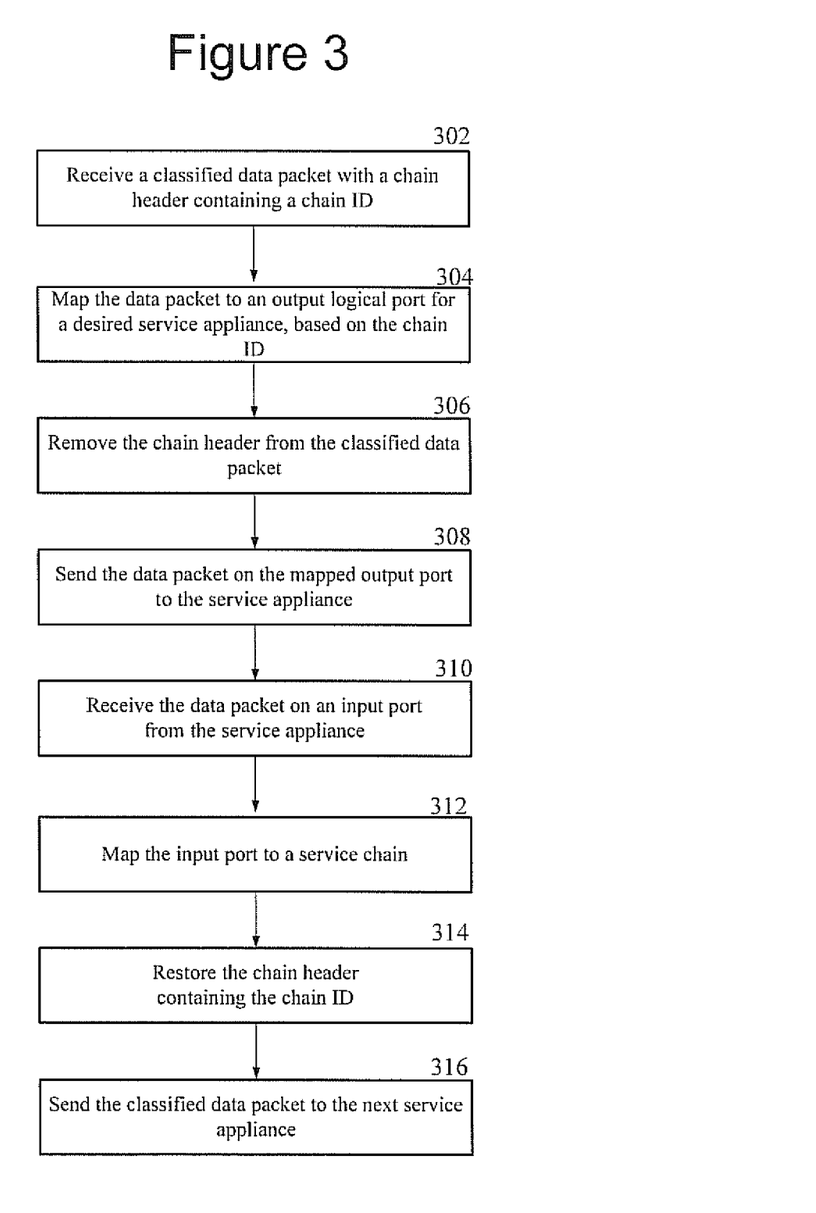
FIG. 3 illustrates a flow diagram, illustrating the computer-executed steps to a method for processing data packets with service chain headers for service appliances that are unable to process service chain headers in accordance with an embodiment of the present invention.

FIG. 3 is a flow diagram illustrating exemplary steps to a computer executed process for processing chain headers for non SCH-aware service appliances 108 that are unable to process service chain headers 107A, as illustrated in FIGS. 1,2A, and 2B. In block 302 of FIG. 3, a classified data packet 107 is received by a proxy device 114. As discussed herein, the received classified data packet 107 comprises a chain header 107A that was classified by a classifier 104 and a data packet 106. The chain header 107A includes a chain ID. In block 304 of FIG. 3, the data packet 106 is mapped to a corresponding output logical port (P1, P3, P5, or P7) for a non SCH-aware service appliance (108-1 or 108-2), based on the chain ID. In block 306 of FIG. 3, the chain header 107A is removed from the classified data packet 107 to become a data packet 106 (that does not contain a service chain header 107A).

In block 308 of FIG. 3, the data packet 106 is sent on the mapped output port associated with a particular service instance (228-1, 228-2, 228-3, or 228-4) of the corresponding service appliance (108-1 or 108-2) in accordance with the previously determined chain to port and port to service instance mappings that correspond to the data packet's 106 removed service chain header 107A. As discussed herein, once the service instance (228-1, 228-2, 228-3, or 228-4) receives the data packet 106, the service instance (228-1, 228-2, 228-3, or 228-4) provides its network services, and then in block 310 of FIG. 3, the data packet 106 is returned, such that the proxy device 114 receives the data packet 106 on an input port (P2, P4, P6, or P8) from the non SCH-aware service appliance (108-1 or 108-2).

In block 312 of FIG. 3, upon receiving the data packet 106, the proxy device 114 maps the input port (P2, P4, P6, or P8) to a particular service chain (as identified by a chain ID). In block 314 of FIG. 3, the proxy device 114 restores the previously removed service chain header 107A containing the chain ID, based upon the mapped logical port that was used to send and receive the particular data packet 106. Then in block 316 of FIG. 3, the classified data packet 107 is sent to a next service appliance (108 or 109).

As discussed herein, exemplary embodiments of this disclosure may allow the integration of a large number of existing non SCH-aware service appliances (that are not able to process service chain headers) into a service network 100 that also contains service appliances 109 that are able to process service chain headers 107A. Such an exemplary integration broadens potential markets for new service controllers and service chain proxy devices.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:
1. A method, comprising:
   receiving a classified data packet having a chain header and a data packet, wherein the chain header includes a chain ID that identifies a particular service chain of network services;
   mapping the data packet to a logical port associated with a service instance of a service appliance that is incapable of processing the chain header based on the chain ID;
   removing the chain header from the classified data packet;
   sending the data packet to the service instance of the service appliance via the logical port;

receiving a processed version of the data packet from the service appliance via the logical port;

restoring the chain header to the processed version of the data packet to obtain a restored classified data packet; and sending the restored classified data packet to a next service appliance.

2. The method of claim 1, wherein the logical port includes an input port and an output port, wherein both the input port and the output port are associated with the service instance of the service appliance.

3. The method of claim 2, wherein mapping the data packet to the logical port associated with the service instance of the service appliance comprises:

mapping the data packet to the output port based on the chain ID; and mapping the output port to the service instance of the service appliance.

4. The method of claim 3, wherein sending the data packet to the service instance of the service appliance via the logical port comprises sending the data packet to the service instance of the service appliance via the output port.

5. The method of claim 3, further comprising mapping the input port to the service instance of the service appliance.

6. The method of claim 5, wherein receiving the processed version of the data packet from the service appliance via the logical port comprises receiving the processed version of the data packet from the service instance of the service appliance via the input port.

7. The method of claim 1, wherein mapping the data packet to the logical port associated with the service instance of the service appliance comprises:

mapping the logical port to the service instance of the service appliance.

8. The method of claim 1, wherein restoring the chain header to the processed version of the data packet to obtain a restored classified data packet comprises prepending the chain header to the processed version of the data packet.

9. A proxy device comprising:

a processor; and a non-transitory computer readable storage medium storing programming for execution by the processor, the programming including instructions to:

receive a classified data packet having a chain header and a data packet;

map the data packet to a logical port associated with a service instance of a service appliance that is incapable of processing the chain header based on a chain ID contained in the chain header remove the chain header from the classified data packet;

send the data packet to the service instance of the service appliance via the logical port;

receive a processed version of the data packet from the service appliance via the logical port;

restore the chain header to the processed version of the data packet to obtain a restored classified data packet; and send the restored classified data packet to a next service appliance.

10. The proxy device of claim 9, wherein the logical port is associated with the chain ID.

11. The proxy device of claim 9, wherein the instructions to restore the chain header to the processed version of the data packet includes instructions to prepend the chain header to the processed version of the data packet.

12. The proxy device of claim 9, wherein the instructions to map the data packet to the logical port associated with the service instance of the service appliance include instructions to:

map the logical port to the service instance of the service appliance.

13. The proxy device of claim 9, wherein the proxy device is a part of one of a network device, a virtual machine running on a server, a part of a switch, or a part of a service appliance.

14. The proxy device of claim 9, wherein the logical port associated with the chain ID includes an output port and an input port, wherein both the output port and the input port are mapped to the service instance of the service appliance.

15. A service system comprising:

a proxy device configured to receive a classified data packet having a chain header and a data packet; and a service appliance having a port to service instance mapping mechanism coupled to the proxy device via a plurality of logical ports, wherein the service appliance is incapable of processing the chain header, wherein the proxy device is further configured to obtain a chain ID from the chain header, to map the data packet to a first one of the plurality of logical ports based on the chain ID, to remove the chain header from the classified data packet, to send the data packet to the service instance of the service appliance via the logical port, to receive a processed version of the data packet from the service appliance via the logical port, to restore the chain header to the processed version of the data packet to obtain a restored classified data packet, and to send the restored classified data packet to a next service appliance, wherein the port to service instance mapping mechanism is configured to map the first logical port the service appliance.

16. The service system of claim 15, wherein the proxy device is configured to restore the chain header to the processed version of the data packet by prepending the chain header to the processed version of the data packet.

17. The service system of claim 15, wherein the port to service instance mapping mechanism is configured to map the first logical port to the service instance of the service appliance.

18. The service system of claim 15, wherein the one of the plurality of logical ports includes an input port and an output port, wherein both the input port and the output port are mapped to the service instance of the service appliance by the port to service instance mapping mechanism.

19. The service system of claim 15, wherein the proxy device is one of a network device, a virtual machine running on a server, a part of one of a switch, or a part of a service appliance.

20. The service system of claim 15, wherein the service appliance comprises at least one of a virtual machine and a physical, hardware implemented appliance.

* * * * *